Figure 1:
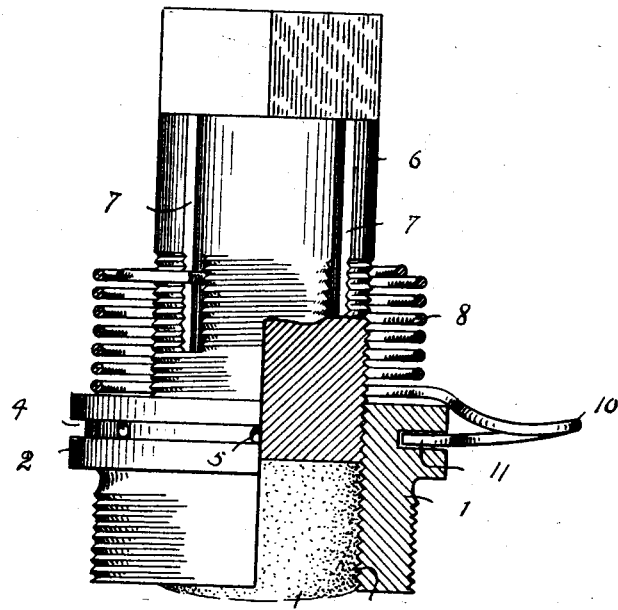

Jan. 15, 1929.

H. B. SPENCER 1,698,773

GREASE PLUG

Filed June 3, 1927

Inventor

Hugh B. Spencer.

By Geo. Stevens.

Attorney

Patented Jan. 15, 1929.

1,698,773

UNITED STATES PATENT OFFICE.

HUGH B. SPENCER, OF DULUTH, MINNESOTA, ASSIGNOR OF ONE-HALF TO WILLIAM R. SMITH, OF WINNIPEG, MANITOBA, CANADA.

GREASE PLUG.

Application filed June 3, 1927. Serial No. 196,296.

This invention relates to grease cups and has special reference to a plug controlled cup, the principal object being to produce a novel form of controlling means for grease cups or plugs, and one more practical, efficient, and dependable than heretofore known.

Other objects and advantages of the invention will appear in the further description thereof.

Figure 2:
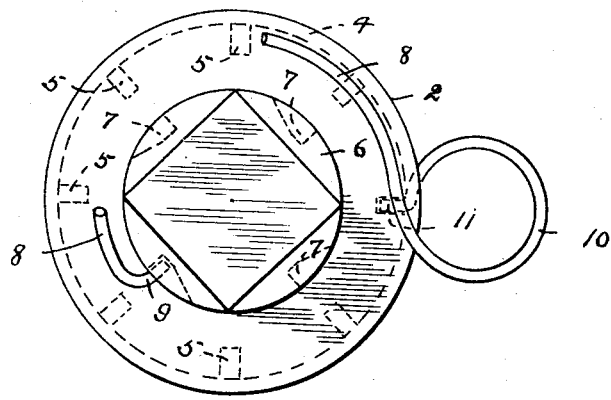

Referring now to the accompanying drawing, forming part of this application, and wherein like reference characters indicate like parts:

Figure 1 is a combination side elevation and sectional view of one of the completely assembled plugs having grease therein; and Figure 2 is a top plan view of Figure 1 showing a fragmental portion only of the spring which controls the plug.

1 represents the grease containing plug or receptacle which is externally screw threaded upon its lower end for application to a locomotive connecting rod or the like to which the grease is to be applied, and having formed upon its upper end the annular flange or rim 2, this plug also being hollow and internally screw threaded its entire length as at 3. About the central portion of the annular flange or rim 2 is formed a rectangularly shaped groove 4, and in the circumferential face of this groove is a plurality of radially disposed holes 5, the object of which will be described later.

Within the bore of the major plug 1 is screw threadedly mounted the minor or feeding plug 6 which is preferably approximately twice the length of the major plug 1, and the lower end of which is screw threaded a distance sufficient for the plug 6 to be screw threaded within the plug 1 the full depth of the latter, the balance of the plug 6 being smooth except as respects its uppermost extremity which is squared for convenience in applying a wrench or the like.

Longitudinally of the plug 6 and in the circumferential face therof are formed angularly shaped slots or grooves 7, they being disposed radially, and preferably numbering four equally spaced about the plug.

Resting upon the upper face of the plug 1 and circumventing the plug 6 is the contractile helical spring 8, preferably somewhat larger in diameter than the plug 6 and the upper one or two coils of this spring are somewhat smaller than the remainder of the coils thereof with the extreme uppermost terminal of said spring inclined in a sharply bent hook-like portion 9 which normally extends within one of the slots or grooves 7 in the plug 6, while the opposite or lower extremity of the spring 8 is drawn tangently from the body portion thereof and curled into a loop 10, said loop being for convenient engagement by a finger of the human hand, the inner most extremity of which is bent sharply outwardly in respect to the loop but inwardly in respect to the plug as at 11 for convenient engagement with any of the holes 5 within the rim or flange 2 of the major plug 1, this spring being so constructed that the terminal 9 normally remains within one of the grooves 7 in the minor plug, while the other terminal 11 remains normally within one of the holes 5 in the major plug so that when the major plug is filled with grease as indicated at 12 and the minor plug is in its partially withdrawn position, all that is necessary to impart a feeding tendency to the plug is to withdraw the terminal 11 of the spring 8 from its abiding place within tne plug 1 and impart stress to the spring by drawing the loop 11 around in a clockwise manner to any one of the other holes and there establish same for subsequent rotative motion of the plug 6 by the action of said spring when the grease becomes sufficiently warmed to permit of same, it being known to those versed in the art that a very hard and non-fluid grease is used in such devices.

The grooves 7 are preferably formed as clearly shown in dotted lines Figure 2 with one face upon a true radial line for active engagement by the hook 9 of the spring while the opposite face is inclined tangently so that the minor plug may be turned clockwise by hand irrespective of the hook 9 of the spring, but the latter at all times tending to hold the plug from unscrewing so long as the hook 9 is engaged within any of the grooves 7.

While I have shown the spring 8 as comprising a number of coils, it is evident that even half a coil, as illustrated in Figure 2, would function for either simply holding the plug against backward rotation or as a predetermined pressure means as described.

From the foregoing it is evident that I have devised an exceedingly simple and practical grease plug which may be quickly and conveniently set to feed as desired, and one free from the danger of loss of parts thereof by vibration.

Having thus described my invention what I claim and desire to secure by Letters Patent, is:

1. A grease feeding receptacle comprising a plug body, a feeding plug threaded within the plug body, a coil spring surrounding the feeding plug for rotating same one end of which engages the latter and the other end engaging the plug body, means at both ends of the spring whereby to govern the extent of its rotative action.

2. A grease feeding receptacle comprising a major grease containing plug, a minor feeding plug screw threadedly mounted therein, means including a spring for rotating the feeding plug and surrounding same; said means being cooperatively associated with both plugs, and selective means at both ends of the last mentioned means for governing the action of same.

3. A grease feeding receptacle comprising a plug body, a feeding plug threaded within the plug body, a coil spring surrounding the feeding plug for rotating same one end of which engages the latter and the other end engaging the plug body, and means at both ends of the spring whereby to govern the extent of its rotative action, said means comprising a plurality of circumferentially spaced holes in the plug body and a plurality of circumferentially spaced longitudinal slots in the plug.

In testimony whereof I affix my signature.

HUGH B. SPENCER.